United States Patent [19]
Yamaguchi et al.

[11] Patent Number: 5,239,618
[45] Date of Patent: Aug. 24, 1993

[54] DATA PROCESSING DEVICE WITH NETWORK STRUCTURE AND ITS LEARNING PROCESSING METHOD

[75] Inventors: Yukiko Yamaguchi; Shinta Kimura, both of Kawasaki, Japan

[73] Assignee: Fujitsu Limited, Kawasaki, Japan

[21] Appl. No.: 631,118

[22] Filed: Dec. 20, 1990

[30] Foreign Application Priority Data

Dec. 20, 1989 [JP] Japan .................................. 1-330698

[51] Int. Cl.$^5$ ............................................ G06F 15/18
[52] U.S. Cl. ........................................ 395/23; 395/24
[58] Field of Search ................... 364/513; 395/23, 24, 395/27

[56] References Cited

FOREIGN PATENT DOCUMENTS

| | | |
|---|---|---|
| 388474 | 9/1990 | European Pat. Off. |
| 173257 | 7/1989 | Japan. |
| WO8807234 | 9/1988 | World Int. Prop. O. |
| WO9014631 | 11/1990 | World Int. Prop. O. |

OTHER PUBLICATIONS

McClelland et al., Explorations in Parallel Distributed Processing, MIT Press, 1988, pp. 1-3, 137-150.
Kung et al., "A Unified Systolic Architecture for Artificial Neural Networks", Jour. Parallel & Dist. Processing, Jun. 1989, pp 358-387.
Eberhardt et al., "Design of Parallel Hardware Neural Network Systems from Custom Analog VLSI 'Building Block' Chips," ICNN, Jun. 1989, vol. 2, pp. II-18-3-II190.
Lippmann, R. P., "An Introduction to Computing with Neural Nets", IEEE ASSP Magazine, Apr. 1987, 4-22.
Patent Abstracts of Japan, vol. 13, No. 448 (p. 942), Oct. 9, 1989 for JP-A-173257.
Signal Processing IV: Theories and Applications, vol. 1, Sep. 1988, North Holland pp. 7-14, J. Herault.
European Search Report, The Hague, search completed Aug. 5, 1991.

*Primary Examiner*—Allen R. MacDonald
*Assistant Examiner*—Robert W. Downs
*Attorney, Agent, or Firm*—Staas & Halsey

[57] ABSTRACT

An output layer in a layered neural network uses a linear function or a designated region (linear region) of a threshold function instead of the threshold function to convert an input signal to an analog output signal When the basic unit uses the linear function, a limiter for limiting the output to a region between 1.0 and 0. When the basic unit uses the designated linear region of the threshold function, a limiter limits the output to a region between 0.8 and 0.2. Upon a learning operation, the error propagation coefficient is determined as a constant value such as 1/6 and when the majority of the desired values are 1 or near 1, an error value regarding the opposite desired value 0 is amplified, and when the output values become equal to or more than 1, it is deemed that there is no error with regard to the output of more than 1 in case of many outputs 1, thereby speeding up an operation of updating the weight.

6 Claims, 17 Drawing Sheets

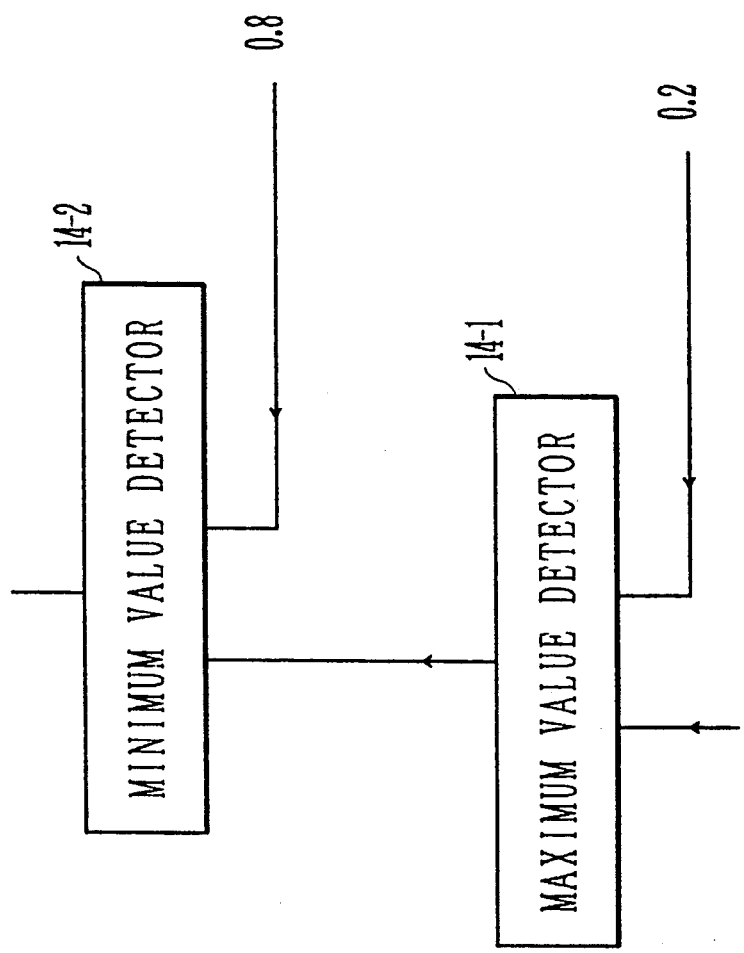

| No. | s | t | $d_{p,j}$ | No. | s | t | $d_{p,j}$ | No. | s | t | $d_{p,j}$ |
|---|---|---|---|---|---|---|---|---|---|---|---|
| 1 | 1 | 11 | 0.00 | 21 | 3 | 11 | 0.00 | 41 | 5 | 11 | 0.00 |
| 2 | 1 | 12 | 0.00 | 22 | 3 | 12 | 0.00 | 42 | 5 | 12 | 0.00 |
| 3 | 1 | 13 | 0.00 | 23 | 3 | 13 | 0.00 | 43 | 5 | 13 | 0.00 |
| 4 | 1 | 14 | 0.01 | 24 | 3 | 14 | 0.00 | 44 | 5 | 14 | 0.00 |
| 5 | 1 | 15 | 0.00 | 25 | 3 | 15 | 0.00 | 45 | 5 | 15 | 0.09 |
| 6 | 1 | 16 | 0.02 | 26 | 3 | 16 | 0.00 | 46 | 5 | 16 | 0.00 |
| 7 | 1 | 17 | 0.00 | 27 | 3 | 17 | 0.00 | 47 | 5 | 17 | 0.00 |
| 8 | 1 | 18 | 0.00 | 28 | 3 | 18 | 0.00 | 48 | 5 | 18 | 0.00 |
| 9 | 1 | 19 | 0.00 | 29 | 3 | 19 | 0.00 | 49 | 5 | 19 | 0.00 |
| 10 | 1 | 20 | 0.00 | 30 | 3 | 20 | 0.37 | 50 | 5 | 20 | 0.00 |
| 11 | 2 | 11 | 0.03 | 31 | 4 | 11 | 0.00 | 51 | 6 | 11 | 1.00 |
| 12 | 2 | 12 | 0.00 | 32 | 4 | 12 | 0.00 | 52 | 6 | 12 | 0.00 |
| 13 | 2 | 13 | 0.00 | 33 | 4 | 13 | 0.00 | 53 | 6 | 13 | 0.00 |
| 14 | 2 | 14 | 0.00 | 34 | 4 | 14 | 0.00 | 54 | 6 | 14 | 0.00 |
| 15 | 2 | 15 | 0.00 | 35 | 4 | 15 | 0.00 | 55 | 6 | 15 | 0.00 |
| 16 | 2 | 16 | 0.00 | 36 | 4 | 16 | 0.00 | 56 | 6 | 16 | 0.02 |
| 17 | 2 | 17 | 0.00 | 37 | 4 | 17 | 0.00 | 57 | 6 | 17 | 0.00 |
| 18 | 2 | 18 | 0.00 | 38 | 4 | 18 | 0.00 | 58 | 6 | 18 | 0.00 |
| 19 | 2 | 19 | 0.00 | 39 | 4 | 19 | 0.00 | 59 | 6 | 19 | 0.00 |
| 20 | 2 | 20 | 1.00 | 40 | 4 | 20 | 0.00 | 60 | 6 | 20 | 0.00 |

Fig. 10A

| No. | s | t | $d_{p,j}$ | No. | s | t | $d_{p,j}$ |
|---|---|---|---|---|---|---|---|
| 61 | 7 | 11 | 0.42 | 81 | 9 | 11 | 0.00 |
| 62 | 7 | 12 | 0.00 | 82 | 9 | 12 | 0.00 |
| 63 | 7 | 13 | 0.01 | 83 | 9 | 13 | 0.00 |
| 64 | 7 | 14 | 0.00 | 84 | 9 | 14 | 0.00 |
| 65 | 7 | 15 | 0.00 | 85 | 9 | 15 | 0.00 |
| 66 | 7 | 16 | 0.00 | 86 | 9 | 16 | 0.00 |
| 67 | 7 | 17 | 0.00 | 87 | 9 | 17 | 1.00 |
| 68 | 7 | 18 | 0.00 | 88 | 9 | 18 | 0.00 |
| 69 | 7 | 19 | 0.00 | 89 | 9 | 19 | 0.00 |
| 70 | 7 | 20 | 0.00 | 90 | 9 | 20 | 0.00 |
| 71 | 8 | 11 | 0.00 | 91 | 10 | 11 | 0.00 |
| 72 | 8 | 12 | 0.01 | 92 | 10 | 12 | 0.00 |
| 73 | 8 | 13 | 0.00 | 93 | 10 | 13 | 0.00 |
| 74 | 8 | 14 | 0.00 | 94 | 10 | 14 | 0.00 |
| 75 | 8 | 15 | 0.00 | 95 | 10 | 15 | 0.00 |
| 76 | 8 | 16 | 0.00 | 96 | 10 | 16 | 0.35 |
| 77 | 8 | 17 | 0.00 | 97 | 10 | 17 | 0.00 |
| 78 | 8 | 18 | 0.39 | 98 | 10 | 18 | 0.00 |
| 79 | 8 | 19 | 0.00 | 99 | 10 | 19 | 0.00 |
| 80 | 8 | 20 | 0.00 | 100 | 10 | 20 | 0.00 |

Fig. 10B

DATA PROCESSING DEVICE WITH NETWORK STRUCTURE AND ITS LEARNING PROCESSING METHOD

FIELD OF THE INVENTION

The present invention relates to a network structure data-processing apparatus for executing adaptive data processing in accordance with the data conversion processing function of a network structure and a learning processing method for learning a weight value of the network structure and more particularly to a network-structure data-processing apparatus capable of dealing with analog data and a learning processing method for executing a learning of a weight value of the network structure at a high speed.

The conventional sequential processing computer (Von Neumann type computer) cannot adjust its data processing function in accordance with changes in its method of use or the environment. Thus, a data processing apparatus with adaptivity in accordance with a parallel distribution processing system using a layer network is newly proposed in the field of pattern recognition and adaptive filtering, for example. A data processing apparatus with a network structure needs to obtain a weight value of the network structure defining the data processing function by means of a learning process. A learning processing method called a back propagation method (D. E. Rumelhart, G. E. Hinton, and R. J. Williams, "Learning Internal Representations by Error Propagation", PARALLEL DISTRIBUTED PROCESSING, Vol. 1, pp. 318-364, The MIT Press, 1986) is notable because of its high practicability.

A data processing apparatus with a layer network structure forms a layer network comprising a node called a basic unit and an inner connection with a weight value corresponding to an inner state value. FIG. 1 shows a basic structure of a basic unit 1. The basic unit 1 has a multi-input-one-output system and is provided with a multiplication processing unit 2 for multiplying a plurality of inputs by respective weight values of inner connection; an accumulating processing unit 3 for adding all the results of the multiplications, i.e., all the products; and a threshold processing unit 4 for applying a non-linear threshold process to the accumulated value and for outputting one final output. Many basic units 1 with such a structure are connected in a layer manner to constitute a layer network as shown in FIG. 2 by forming an input layer by input units 1' for distributing an input signal value and by performing a data processing function of converting an input pattern (input signal) to an output signal (output pattern).

For such a layer network, the back propagation method determines the weight value of the inner connection in the layer network in accordance with a predetermined learning algorithm so that the output pattern output from the layer network in response to the input pattern prepared for the learning forms a desired pattern (desired signal). When the weight value is determined by this process, the layer network can produce an appropriate output signal even if the input signal which is not expected in a form of learning is input, thereby realizing a "flexible" data processing function.

In order to make a network-structure data-processing apparatus with such a configuration practical, it is necessary for it to deal with the output pattern of the analog level, to realize, in a short time, the process of learning the weight value, and to enable the output pattern of the analog output level to be obtained.

A data processing apparatus with a layer network structure enables the accumulating processing unit 3 of the basic unit 1 to execute the arithmetic operation shown by equation (1) and the threshold processing unit 4 thereof to execute the arithmetic operation shown by equation (2), where the h layer designates a pre-stage layer and the i layer designates a post-stage layer.

$$x_{pi} = \sum_h y_{ph} W_{ih} \tag{1}$$

$$y_{pi} = 1/(1 + \exp(-x_{pi} + \theta_i)) \tag{2}$$

where,
h: a unit number of an h layer,
i: a unit number of an i layer,
p: a pattern number of an input signal,
$\theta_i$: a threshold of an i-th unit of an i layer,
$W_{ih}$: a weight of an inner connection between h-i layers,
$X_{pi}$: a sum-of-products value for the input from respective units in the h layer to the i-th unit in the i layer and corresponding to an input signal of the p-th patterns,
$y_{ph}$: an output from the h-th unit of the h layer in response to an input signal of the p-th pattern,
$y_{pi}$: an output from the i-th unit in the i layer in response to an input signal of the p-th pattern.

The back propagation method learns the weight value $W_{ih}$ and threshold $\theta_i$ through an adaptive automatic adjustment by feeding back the error. It is necessary to carry out an adjustment of the weight $W_{ih}$ and threshold $\theta_i$. The adjustment is a difficult processing because the weight and the threshold interfere with each other as is clear from equations (1) and (2). As disclosed in an earlier Japanese Patent Application No. 62-333484 filed on Dec. 28, 1987 and titled "Network Structure Data Processing assigning threshold $\theta_i$ to the output "1" as a weight is provided to the h layer on the input side. Thus, threshold value $\theta_i$ is incorporated in weight $W_{ih}$ and threshold value $\theta_i$ is treated as the weight.

Therefore, the above equations (1) and (2) can be expressed as follows.

$$x_{pi} = \sum_h y_{ph} W_{ih} \tag{3}$$

$$y_{pi} = 1/(1 + \exp(-x_{pi})) \tag{4}$$

Next, the prior art process of learning a weight value by a back propagation method in accordance with the equations (3) and (4) is explained. This is explained by using a layer network of a three-layered structure comprising an h layer-i layer-j layer as shown in FIG. 2.

The following expression is obtained from the above equations (3) and (4).

$$x_{pj} = \sum_i y_{pi} W_{ji} \tag{5}$$

$$y_{pj} = 1/(1 + \exp(-x_{pj})) \tag{6}$$

Where
j: a unit number of j layer, $W_{ji}$: a weight value of an inner connection between i-j layers, $X_{pj}$: a sum-of-products of inputs from respective units in the i layer to the j-th unit of the j layer in response to an input signal of the p-th pattern, and $y_{pj}$: an output from the j-th unit of the j layer in response to the p-th pattern of an input signal.

The back propagation method calculates an error vector component $E_p$ of a sum of a second power of an error between an output pattern from the output layer and the desired pattern which the output pattern becomes equal to, in accordance with the following equation (7) and calculates a total sum of error vector component $E_p$ as an error of the data process function in accordance with the following equation (8).

$$E_p = \frac{1}{2} \sum_j (y_{pj} - d_{pj})^2 \quad (7)$$

$$E = \sum_p E_p \quad (8)$$

Where, $E_p$: an error vector component in response to an input signal of a p-th pattern E: a total sum of an error vector component in response to an input signal with all the patterns $d_{pj}$: a desired signal to the j-th unit of a j layer in response to an input signal of a p-th pattern In order to obtain a relation between an error vector component $E_p$ and an output signal $y_{pj}$ from the j-th layer, the equation (7) is subjected to a partial differentiation with regard to $y_{pj}$ $$\frac{\partial E_p}{\partial y_{pj}} = y_{pj} - d_{pj} = \delta_{pj}$$

Further, in order to obtain a relation between an error vector component $E_p$ and an input $x_{pj}$ to the j layer, the error vector component $E_p$ is subjected to a partial differentiation with regard to $X_{pj}$ $$\frac{\partial E_p}{\partial x_{pj}} = \frac{\partial E_p}{\partial y_{pj}} \cdot \frac{\partial y_{pj}}{\partial x_{pj}}$$

$$= \delta_{pj} y_{pj}(1 - y_{pj})$$

In order to obtain the relation between the error vector component $E_p$ and the weight $W_{ji}$ between the i-j layers, the error vector component $E_p$ is partially differentiated with regard to $W_{ji}$, the following equation is obtained, thereby providing the solution expressed by a sum-of-products, $$\frac{\partial E_p}{\partial W_{ji}} = \frac{\partial E_p}{\partial x_{pj}} \cdot \frac{\partial x_{pj}}{\partial W_{ji}} \quad (9)$$

$$= \delta_{pj} y_{pj}(1 - y_{pj}) y_{pi}$$

$$= -\alpha_{pj} y_{pi}$$

here, $\alpha_{pj}$ is defined as follows.

$$\alpha_{pj} = -\delta_{pj} y_{pj}(1 - y_{pj}) \quad (10)$$

$$= (d_{pj} - y_{pj})[y_{pj}(1 - y_{pj})]$$

The "$\alpha_{pj}$" is called as a first updating coefficient and the "$[y_{pj}(1-y_{pj})]$" of a first updating coefficient is called the error propagation coefficient.

Next, the change of the error vector component $E_p$ with regard to the output $y_{pi}$ of the i-layer is provided as follows.

$$\frac{\partial E_p}{\partial y_{pi}} = \sum_j \frac{\partial E_p}{\partial x_{pj}} \cdot \frac{\partial x_{pj}}{\partial y_{pi}}$$

$$= \sum_j \delta_{pj} y_{pj}(1 - y_{pj}) W_{ji}$$

Further, the change or variation of an error vector component $E_p$ with regard to the change of the total sum of $X_{pi}$ input to the i-layer is calculated as follows. Then, the following variation expressed in a form of a sum-of-products is obtained.

$$\frac{\partial E_p}{\partial x_{pi}} = \sum_j \frac{\partial E_p}{\partial y_{pj}} \cdot \frac{\partial y_{pj}}{\partial x_{pi}}$$

$$= \frac{\partial E_p}{\partial y_{pi}} \cdot \frac{\partial y_{pi}}{\partial x_{pi}}$$

$$= \left[ \sum_j \delta_{pj} y_{pj}(1 - y_{pj}) W_{ji} \right] y_{pi}(1 - y_{pi})$$

Further, a relation of a change of an error vector component $E_p$ with a change of a weight value $W_{ih}$ between the h-i layers is provided as follows. Then, the resolution is expressed by the following sum-of-products.

$$\frac{\partial E_p}{\partial W_{ih}} = \sum_j \frac{\partial E_p}{\partial x_{pj}} \cdot \frac{\partial x_{pj}}{\partial W_{ih}} \quad (11)$$

$$= \frac{\partial E_p}{\partial x_{pi}} \cdot \frac{\partial x_{pi}}{\partial W_{ih}}$$

$$= \left[ \sum_j \delta_{pj} y_{pj}(1 - y_{pj}) W_{ji} \right] y_{pi}(1 - y_{pi}) y_{ph}$$

$$= -\beta_{pi} y_{ph}$$

Where, $\beta_{pi}$ is defined as follows.

$$\beta_{pi} = -\left[ \sum_j \delta_{pj} y_{pj}(1 - y_{pj}) W_{ji} \right] y_{pi}(1 - y_{pi}) \quad (12)$$

$$= y_{pi}(1 - y_{pi}) \sum_j \alpha_{pj} W_{ji}$$

"$\beta_{pi}$" is called as the second updating coefficient.

The relation between the error E of the layer network and the weight value $W_{ji}$ between i-j layers is obtained with regard to all the input patterns as follows, based on equation (9).

$$\frac{\partial E}{\partial W_{ji}} = \frac{\partial}{\partial W_{ji}} \left( \sum_p E_p \right) \quad (13)$$

$$= \sum_p \frac{\partial E_p}{\partial W_{ji}}$$

$$= -\sum_p \alpha_{pj} y_{pi}$$

The relation between the error E of the layer network and the weight value $W_{ih}$ between the h-i layers is provided with regard to all the input patterns as follows, based on the expression (11).

$$\frac{\partial E}{\partial W_{ih}} = \frac{\partial}{\partial W_{ih}}(\Sigma E_p) \quad (14)$$

$$= \sum_p \frac{\partial E_p}{\partial W_{ih}}$$

$$= -\sum_p \beta_{pi} y_{ph}$$

The equations (13) and (14) designate a variation ratio of the error E of the data processing function of the layer network with regard to the change of the weight in respective layers, and when the weight is changed so that the above value is always negative, the error E of the layer network can be gradually made to be 0 in accordance with a known-gradient method.

According to the back propagation method, firstly, the first updating coefficient $\alpha_{pj}$ and the second updating coefficient $\beta_{pi}$ are calculated in accordance with expressions (10) and (12).

$$\alpha_{pj} = (d_{pj} - y_{pj})[y_{pj}(1 - y_{pj})]$$

$$\beta_{pi} = y_{pi}(1 - y_{pi}) \sum_j \alpha_{pj} W_{ji}$$

Secondly, the updating quantities $\Delta W_{ji}$ and $\Delta W_{ih}$ of the weight value for one updating cycle is calculated in accordance with the following expressions (15) and (16) by using the calculated $\alpha_{pj}$ and $\beta_{pi}$.

$$\Delta W_{ji} = -\epsilon \frac{\partial E}{\partial W_{ji}} = \epsilon \sum_p \alpha_{pj} y_{pi} \quad (15)$$

$$\Delta W_{ih} = -\epsilon \frac{\partial E}{\partial W_{ih}} = \epsilon \sum_p \beta_{pi} y_{ph} \quad (16)$$

Where, $\epsilon(>0)$ is a learning constant.

Sequentially, the following weight value for the next updating cycle is determined in accordance with the updating quantity calculated as shown, $$W_{ji}(t) = W_{ji}(t-1) + \Delta W_{ji}(t)$$

$$W_{ih}(t) = W_{ih}(t-1) + \Delta W_{ih}(t)$$

Where, t is the number of learnings. Therefore, by repeating the above process, the weight values $W_{ji}$ and $W_{ih}$ which cause the error E of the layer network to be at the minimum value are learned.

Further, in order to accelerate the convergence of the error E to the minimum value, the back propagation method further comprises an updating rule of adding data factor relating to the updating quantity of the weight value determined at the previous updating cycle to the updating quantity calculated in accordance with the expressions (15) and (16) as shown in the following expressions.

$$\Delta W_{ji}(t) = \epsilon \sum_p \alpha_{pj} y_{pi} + \zeta \Delta W_{ji}(t-1) \quad (15')$$

$$\Delta W_{ih}(t) = \epsilon \sum_p \beta_{pi} y_{ph} + \zeta \Delta W_{ih}(t-1) \quad (16')$$

where, $\zeta(>0)$ is a momentum

The output signal value $y_{pj}$ output from basic unit 1 in the output layer is provided as the following threshold function as explained in the above expression (6) and represents the input and the output characteristics shown in FIG. 3.

$$y_{pj} = 1/(1 + exp(-x_{pj}))$$

As is clear from FIG. 3, the output signal value $y_{pj}$ obtains the value between in "1" and "0" and provides the values other than value "1" and "0" at the region neighboring the region where the input signal value $X_{pj}$ is "0", and the output signal value $y_{pj}$ becomes linear with regard to the input signal value $X_{pj}$ in the neighboring region.

Therefore, the conventional data processing apparatus of the network structure can execute the learning of the weight value of the network structure by the back propagation method with a sufficient precision with regard to the data processing which deals with the output pattern whose output values have a binary level of "1" or "0", as the processing object. However, the prior art back propagation method can not execute the learning of the weight value of the network structure with a sufficient precision with regard to the data processing which deals with the output pattern whose output values provide a discretional analog level between "1" and "0". Therefore, the conventional data processing apparatus of the network structure cannot achieve a high accuracy with regard to the data processing object whose output value becomes at an analog level.

Further, the processing method of learning the weight by the conventional back propagation method has a problem that the learning speed of the weight value is made extremely slow in the data processing where a majority of desired values of the desired pattern for the learning is "0", namely, the lower limit values of the output from the threshold function and a small number of desired values obtain an analog level between "1" and "0" as seen in a classification process in which a probability value is treated as the specific value. Namely, the back propagation method determines the updating quantity of the weight value by the above equations (15) and (16) (or equations (15') and (16')) and causes the updating quantity of the weight value to be governed by the data relating to the desired value "0" supposing that the output pattern of the desired pattern has one dimension (which means that the number of basic unit in the output layer is one) and the number of the output patterns is 400 and a majority of 400 desired values are "0", resulting in that the data relating to the desired value other than "0" is diluted. Therefore, there is a problem that the output pattern for the input pattern which should produce the desired value other than "0" has a difficulty in convergence in the desired value. The problem also occurs as where a majority of desired signals are "1", namely, the upper limit value output from the threshold function.

Summary of the Invention

An object of the present invention is to provide a data processing apparatus by the network structure capable of dealing with the analog level and to provide the learning processing method capable of executing the learning of weight of the network structure at a high speed.

A feature of the present invention resides in network structure data processing apparatus comprising a basic unit for receiving one or a plurality of inputs from the pre-stage layer and an inner state value to be multiplied with the input or outputs, thereby providing the sum-of-products, converting the sum-of-products by using a predetermined definition function and for providing the final output, an input layer for receiving an input pattern; one or a plurality of stages of intermediate layers comprising a plurality of basic units, an output layer of one or a plurality of basic units, thereby forming an inner connection for determining an inner state value between the input layer and the intermediate layer in the most pre-stage, between the intermediate layers, and between the intermediate layer in the final stage and the output layer, and thereby forming a layer network unit, the basic unit in the intermediate layer using the threshold function, for example, sigmoid function as the definition function, the basic unit in the output layer using a linear function as the definition function, and a limiter for limiting the output value from the output layer by the upper and lower limit values of a desired value of a desired pattern.

BRIEF DESCRIPTION OF THE DRAWINGS

FIG. 6B shows a limiter used in the second embodiment, FIGS. 10A and 10B show a view for explaining a desired pattern used for the simulation.

DESCRIPTION OF THE PREFERRED EMBODIMENTS

Figure 1:
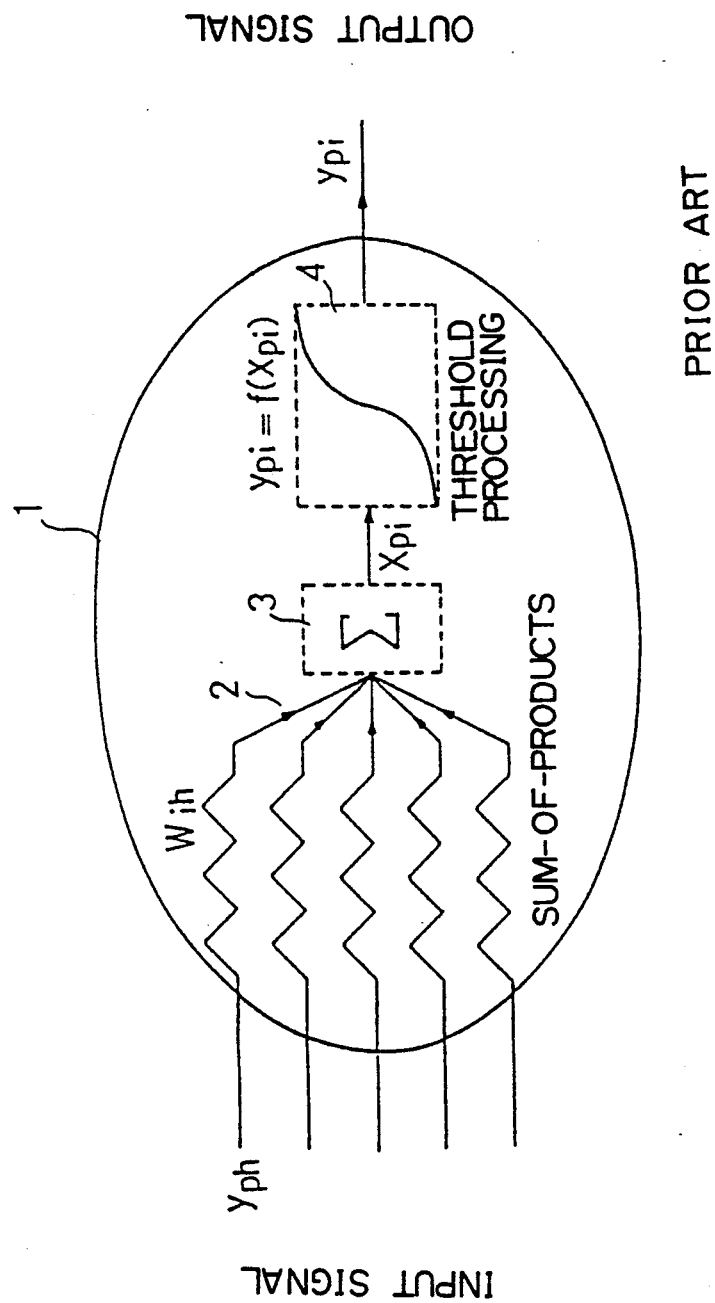
FIG. 1 shows a basic structure of a basic unit.
Figure 2:
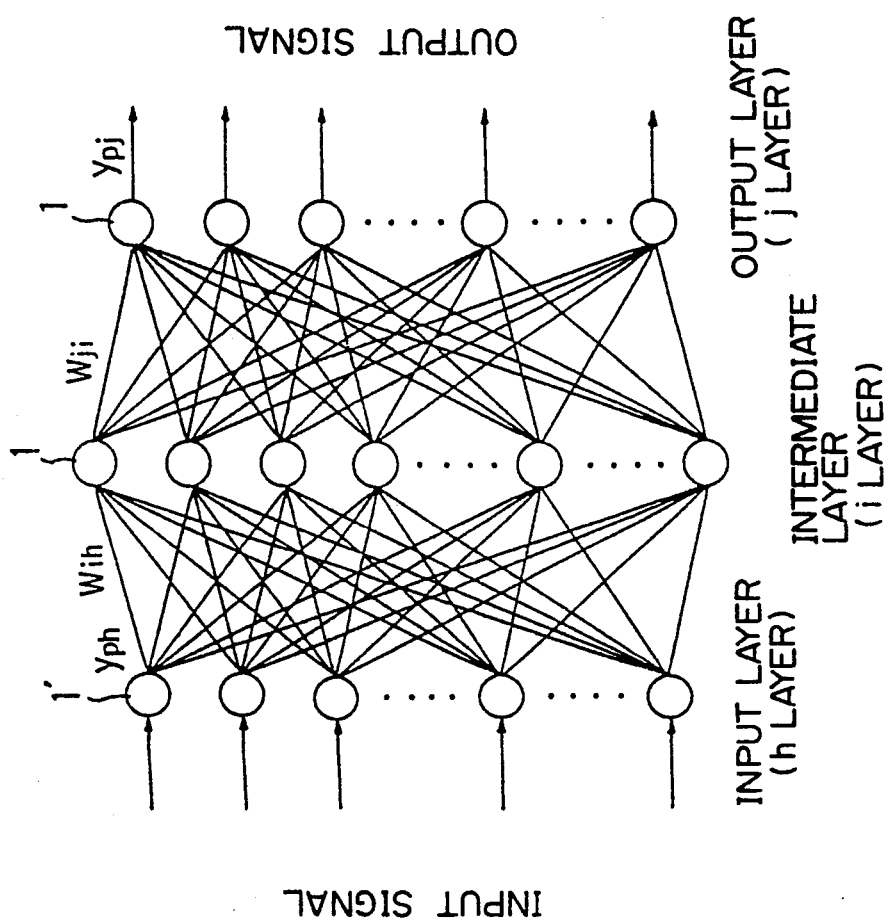
FIG. 2 shows a basic structure of a layer network unit.
Figure 3:
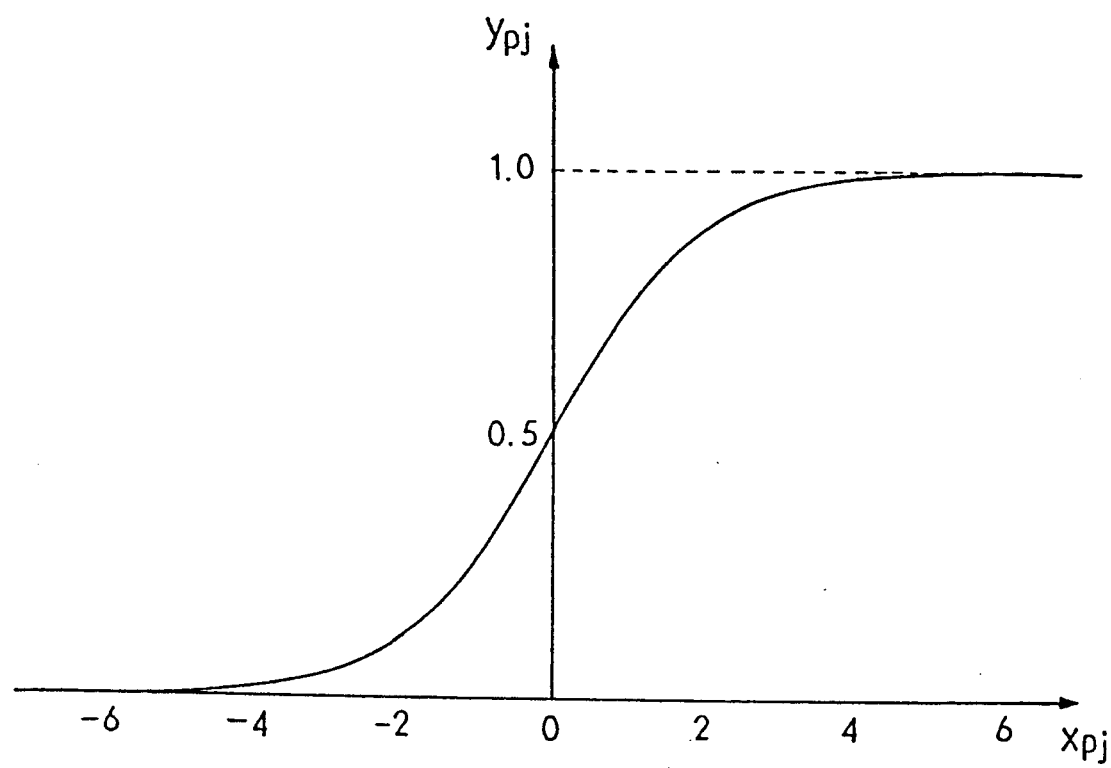
FIG. 3 shows a view for explaining an input and output characteristic of a threshold function.
Figure 4A:
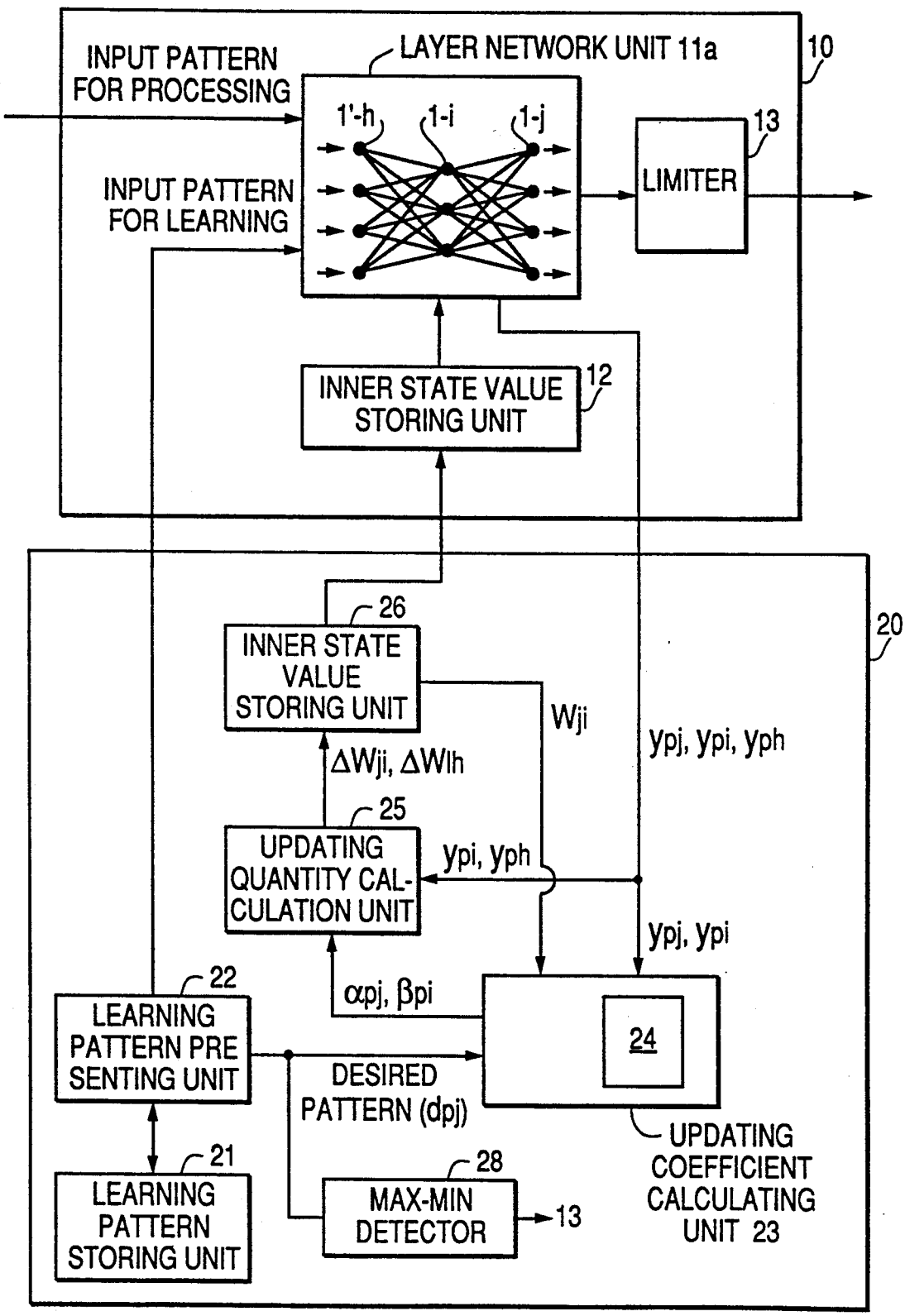
FIG. 4A shows a principle structure of the first embodiment.

FIG. 4A shows a principle structure of the first embodiment constituted by applying a linear function to a basic unit 1 in the output layer of the linear network. 10 designates a network structure data processing apparatus forming the present embodiment and it can deal with a discrimination processing of the analog level signal, 11a shows a layer network unit of the first embodiment and it calculates an output pattern corresponding to an input pattern in accordance with a data conversion function defined by the inner state value of the network structure, 12 is an inner state value storing unit for managing an inner state value which is necessary when the layer network unit 11a executes the data conversion process, 13 is a limiter for limiting the output value output from the layer network unit 11a by the upper and lower limit value of the desired value of the desired pattern.

Layer network unit 11a of the first embodiment comprises an input layer formed of a plurality of input units 1'-h for receiving the input pattern and for then producing the output. It includes one or a plurality of stages of the intermediate layers comprising a plurality of basic units 1-i for receiving a plurality of inputs and inner state values (weight values) to be multiplied with these inputs, for providing a sum-of-products and for converting the obtained sum-of-products value by using the threshold function, thereby producing the final output. It also comprises an output layer formed of one or a plurality of basic units 1-j for receiving a plurality of inputs and inner state values to be multiplied by these inputs, for obtaining the sum-of-products, and for converting the some-of-products value thus obtained by a linear function, thereby providing the final output. A connection is made between input unit 1'-h and basic unit 1-i, between intermediate layers, and between basic unit 1-i and basic unit 1-j, thereby realizing a layer network structure in accordance with the inner state value determined in response to each connection.

20 designates a learning processing apparatus forming the present embodiment for executing a high-speed learning of an inner state value of a layer network unit in accordance with a back propagation method, 21 designates a learning pattern storing unit for storing a learning pattern necessary for a process for learning an inner state value, 22 designates a learning pattern presenting unit for reading a group of learning patterns of a learning subject from the learning pattern storing unit 21, for presenting the group of input patterns to layer network unit 11a and for presenting a group of desired patterns to the updating coefficient calculating unit 23 and to a minimum-maximum detecting unit 28 to then be passed to limiter 13. The updating coefficient calculating unit 23 uses an error propagation coefficient which is determined as a constant value, calculates the first updating coefficient $\alpha_{pj}$ in accordance with the equation (10) and calculates the second updating coefficient $\beta_{pi}$ in accordance with the above equation (12) by using the calculated first updating coefficient $\alpha_{pj}$, for example, in the three-layer network structure. 24 is a learning completion judging unit provided in the updating coefficient calculation unit 23. The learning completion judging unit 24 detects a completion of the learning of the inner state value by detecting that the output pattern $y_{pj}$ from the layer network unit 11a converges in a desired pattern $d_{pj}$. 25 designates an updating quantity calculation unit for calculating an updating quantity of an input inner state value in accordance with expressions (15) and (16), 26 is an inner state value updating unit for updating the inner state value of inner state value storing unit 12 in accordance with an updating quantity calculated by updating quantity calculation unit 25.

In the first embodiment, a configuration is made such that basic unit 1-j of the output layer does not compute the output pattern $y_{pj}$ according to the equation (6)

$$y_{pj} = 1/(1 + \exp(-x_{pj}))$$

where,

-continued $$x_{pj} = \sum_i y_{pi} W_{ji}$$

but does compute it according to an equation for defining the following linear conversion processing, thereby producing the output pattern $y_{pj}$.

$$y_{pj} = k \sum_i y_{pi} W_{ji}$$

where, k is a constant value.

This configuration produces linear outputs between the upper limit value "1" and the lower limit value "0", (or it could be any number depending on the coefficient). Thus, the inner state value can be learned with enough precision with the back propagation method. Accordingly, data of analog values other than outputs "1" or "0" can be processed, so that the analog value output are put on a line determined by the above linear function. With this configuration, when the input pattern for data processing is inputted, an inconvenience may arise when the output value of the output pattern $y_{pj}$ falls outside of the upper and lower limits of the desired value of the desired pattern and becomes more than 1 or less than 0. To counter this, the limiter 13 performs a processing such that each output value of the output pattern $y_{pj}$ falls within the upper and lower limit values of the desired value.

Figure 5:
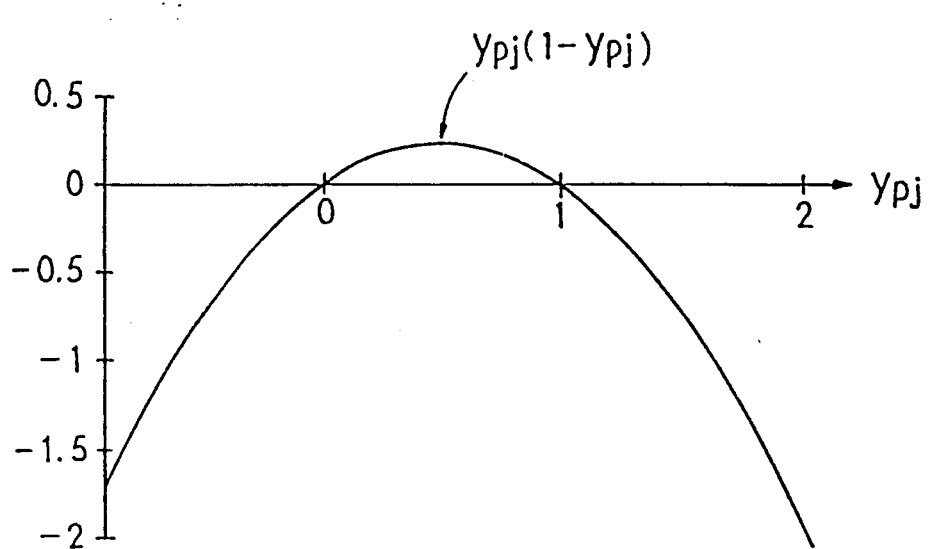
FIG. 5 shows an explanatory view of an error propagation coefficient.

When a learning by a back propagation method is performed, values of error propagation coefficients $[y_{pj}(1-y_{pj})]$ defining the magnitudes of the first and second updating coefficients $\alpha_{pj}$ and $\beta_{pi}$ are on the hyperbola shown in FIG. 5. The fact that the value of the error propagation coefficient is on a hyperbola means that the learning of the inner state value proceeds with a different speed depending on the analog value of the desired value when the analog level values are handled. Namely, where the value of output pattern $y_{pj}$ is near "1" or "0" in FIG. 5, differential value of the threshold function (i.e. a sigmoid function) is small and thus, an error propagation quantity, i.e. weight updating quantity becomes small, thereby resulting in taking a long time in computing a learning operation. Further, as the linear function is used instead of the threshold function in the present embodiment, $y_{pj}$ becomes more than 1 or less than 0. Thus, the error propagation coefficient $y_{pj}$-($y_{pj}$-1) becomes negative as shown in FIG. 5.

To overcome these inconveniences, the updating coefficient calculating unit 23 sets the value of the error propagation coefficient as a positive constant value of approximately the same as the average value when the basic unit 1-j of the output layer uses a threshold value function and computes the first updating coefficient $\alpha_{pj}$ which is then used to compute the second updating coefficient $\beta_{pi}$. With such a configuration, the learning process device 20 performs a learning of the inner state value for a desired analog level value between "1" and "0" at a uniform speed. Thus, learning of an inner state value can be performed at a high speed without being affected by the desired values "1" and "0". The error propagation coefficient can be set positive or negative when using the linear function, and thus it is set at a positive constant (for example, 1/6) as is further explained layer by referring to FIG. 8. Therefore, the inconvenience that the value of the error propagation coefficient becomes negative (regions above "1" and below "0" in FIG. 5) can be avoided, even though a linear function is used. This inconvenience does not occur when the threshold function is used. In other words, the error propagation coefficient (a gradient of a line) is set positive when using the linear function in the same manner as it is always set positive when using the threshold function.

As described above, the embodiment shown in FIG. 4A has a configuration such that the converting function of the input and output of basic unit 1-j of the output layer of the layer network uses a linear function instead of the conventional threshold function. That is, the basic unit 1-j in the output layer is configured to compute and output the output pattern $y_{pj}$ according to $$y_{pj} = k \sum_i y_{pi} W_{ji}$$

which configuration makes the value of the output pattern $y_{pj}$ linear and enables an accurate learning of a weight value even when the desired value is an analog value. Thus, a highly accurate data processing can be executed even when the output value is an analog value.

Figure 4B:
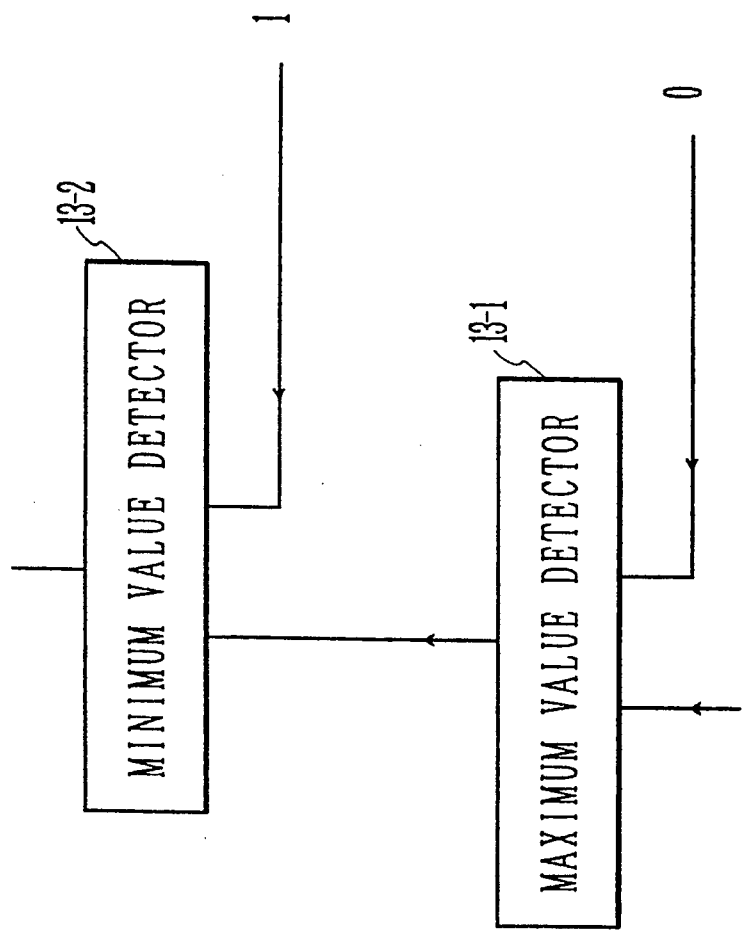
FIG. 4B shows a limiter used in the first embodiment.

FIG. 4B shows an operation of limiter 13 in the first embodiment. An output of layer network unit 11a and "0" are input to maximum value detector 13-1. When the output of layer network 11a is smaller than "0", "0" is output from maximum value detector 13-1. An output of layer network unit 11a and "1" are input to minimum value detector 13-2. When the output of layer network 11a is larger than "1", "1" is output from minimum value detector 13-2. Thus, the limiter 13 produces the output between the upper limit 1 and the lower limit 0.

Figure 6A:
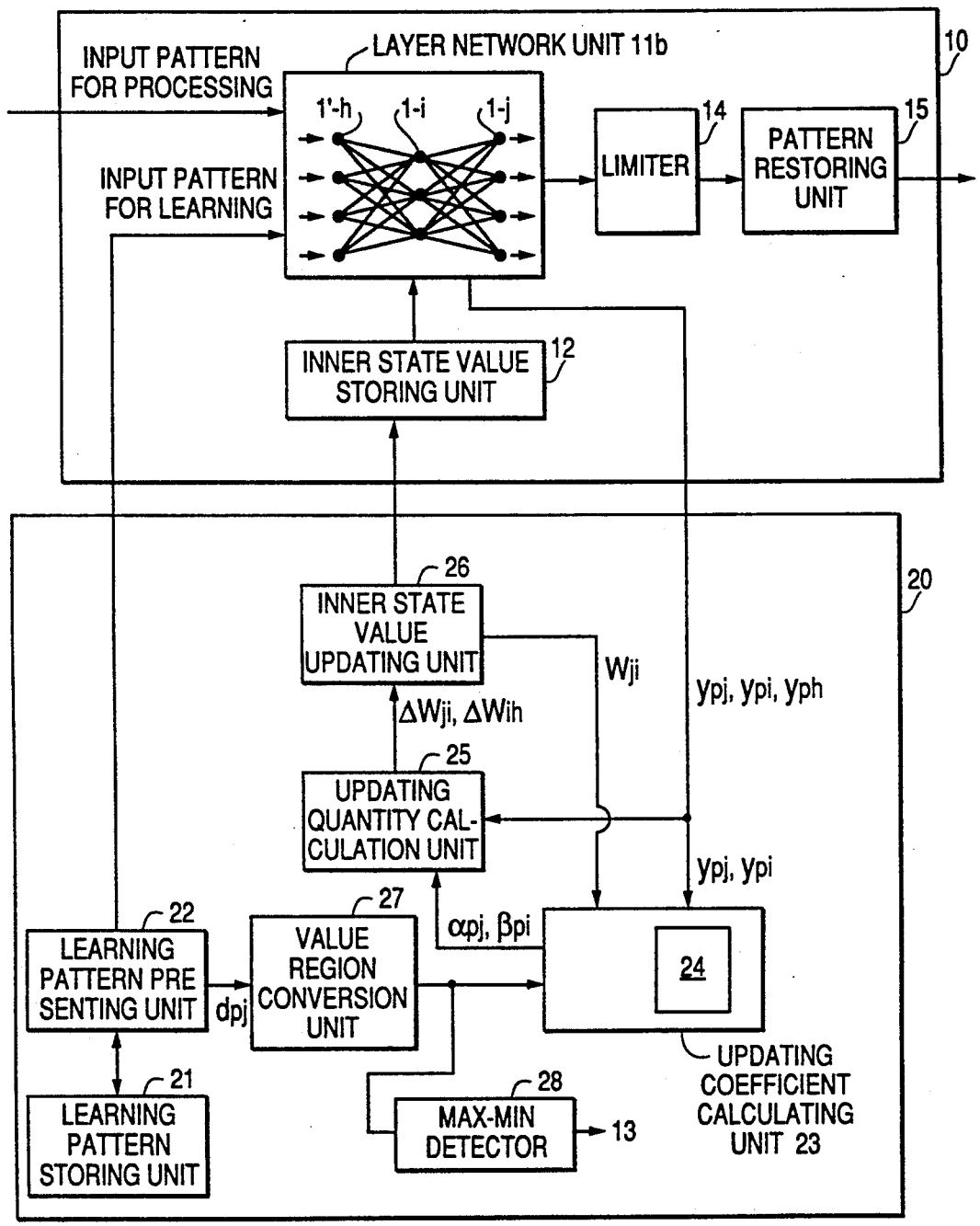
FIG. 6A shows a principle structure of the second embodiment.

FIG. 6A shows a principle structure view of the second embodiment by utilizing a linear region of the threshold function (for example, sigmoid function) of basic unit 1 of the output layer in the layer network. The same part as shown in FIG. 4A is designated by the same reference number. 11b designates a layer network unit of the second embodiment and is provided with a layer network structure and calculates the output pattern corresponding to the input pattern in accordance with the data conversion function determined by the layer network structure and the inner state value of the structure, thereby providing the output. 14 designates a limiter for limiting the output value output from layer network unit 11b by the upper and lower limit values of the desired value which is converted to a designated region value (namely, a value between 0.8 and 0.2), and 15 is a value region restoring unit for converting the output value of limiter 14 to the original value region (namely, 1 to 0) of the desired value obtained before the conversion. In the layer network unit 11b of the second embodiment, basic unit 1-j in the output layer converts the calculated sum-of-products by using the threshold function and thereby provides the final output unlike the layer network 11a of the first embodiment.

The output pattern restoring unit 15 converts the output value y output in response to the converted desired value x' (later-described) to the original output value y' in accordance with the following equation.

$$y' = (y - 0.2)/0.6$$

Therefore, when the output value y is "0.8", for example, the output value y' from the output pattern restoring unit 15 is "1". When the output value y is "0.2", for example, the output value y' is "0".

27 is a value region conversion unit for converting the desired input pattern value presented by the learning pattern presentation unit 22 and to minimum-maximum detecting unit 28 to then be passed to limiter 13 to the designated region value (for example, 0.8 to 0.2) in the linear region of the threshold value function, and for presenting the designated region value to the updating coefficient calculating unit 23. The second embodiment carries out a learning of the inner state value in accordance with the desired pattern with the desired value (for example, between 0.8 and 0.2) obtained by the conversion by the value region converting unit 27.

The value region conversion unit 27 converts a desired value x between 1.0 and 0 to a converted desired value x' between 0.8 and 0.2 in accordance with the following equation.

$$x' = (x \times 0.6) + 0.2$$

Therefore, when the desired value x is "1", the output of the value region conversion unit 27 is "0.8". When the desired value x is "0", the output of the value region conversion unit 27 is "0.2".

Figure 7:
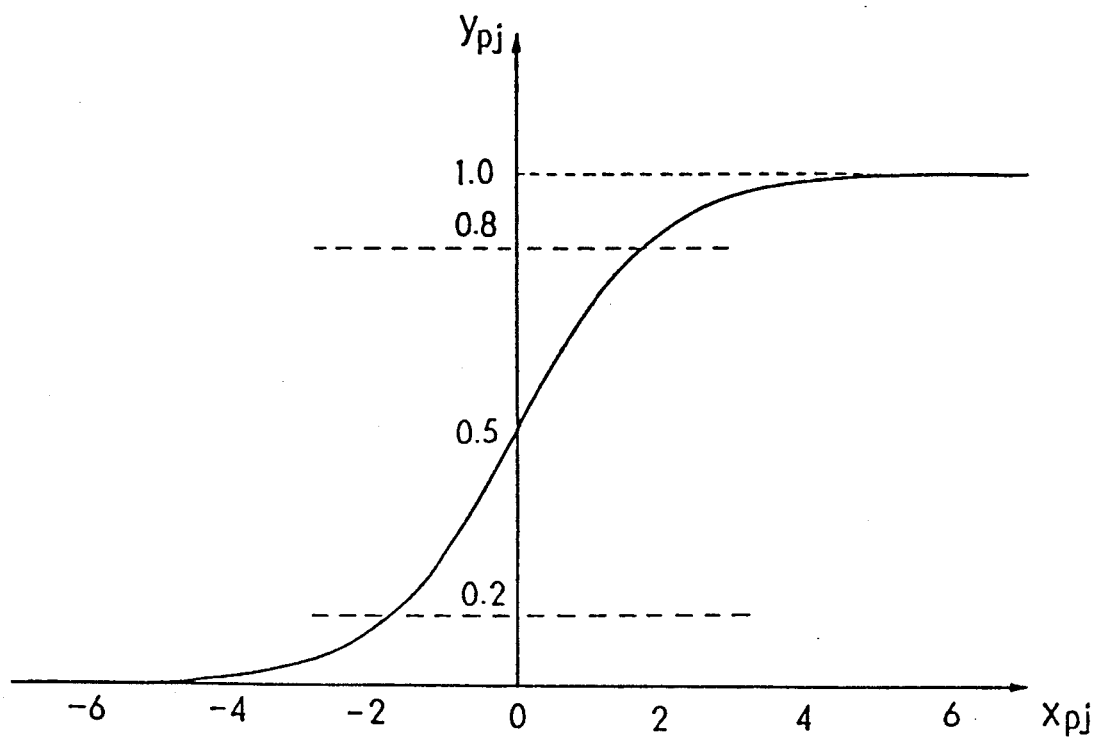
FIG. 7 shows a view for explaining a linear area of the sigmoid function used by the second embodiment.

In the second embodiment shown in FIG. 6A, when a configuration is made such that the basic unit 1-j in the output layer computes and outputs the output pattern $y_{pj}$ according to the threshold function, the value range converting unit 27 converts a desired value in the range "1" to "0" to a value in the range of "0.8" to "0.2", and the learning of the inner state value is executed based on this converted range. The process of computing the output pattern $y_{pj}$ is executed in the linear region of the threshold function as shown in FIG. 7. Then, since the desired pattern is in the range 0.8 to 0.2, the possibility becomes high that the linear region of the threshold function is used. Hence, the learning of the inner state value related to analog values other than "1" and "0" can be performed with enough precision. The data processing of such an analog level value can be handled. With this configuration, when the input pattern for data processing is inputted, an inconvenience may arise such that the output value of output pattern $y_{pj}$ may become higher than 0.8 or lower than 0.2. To counter this, after the limiter 14 executes a processing such that each output value falls within the upper and lower limits (namely, 0.8 and 0.2, for example,) of the desired value, the value region restoring unit 15 converts the output of the limiter 14 to the original value range, (namely, between 1.0 and 0).

As explained in FIG. 6A, in this embodiment, when the threshold value function is used as a conversion function for the basic unit 1-j of the output layer, the desired pattern is limited to the values between 0.8 and 0.2. As a result, only the linear region of the threshold value function is configured to be used. That is, by executing the learning of the weight value, by converting the range of the desired value from "1.0 to 0" to "0.8" to "0.2", the value of the output pattern $y_{pj}$ is limited to the range between "0.8" and "0.2". In an actual data processing, by restoring the value of the output pattern $y_{pj}$ limited to the range between "0.8" and "0.2" back to its original value between "1" and "0", only the linear region of the threshold function is configured to be used. Because this configuration makes the value of the output pattern $y_{pj}$ approximately linear, even if the desired value is at an analog value, an accurate learning of the weight value becomes possible, and the data processing of the analog output value can be accurately performed.

FIG. 6B shows an operation of limiter 14. An output of layer network unit 11a and "0" are input to maximum value detector 14-1. When the output of layer network 11a is smaller than "0.2", "0.2" is output from maximum value detector 14-1. An output of layer network unit 11b and "0.8" are input to minimum value detector 14-2. When the output of layer network 11b is larger than "0.8" is output from minimum value detector 14-2.

Figure 8:
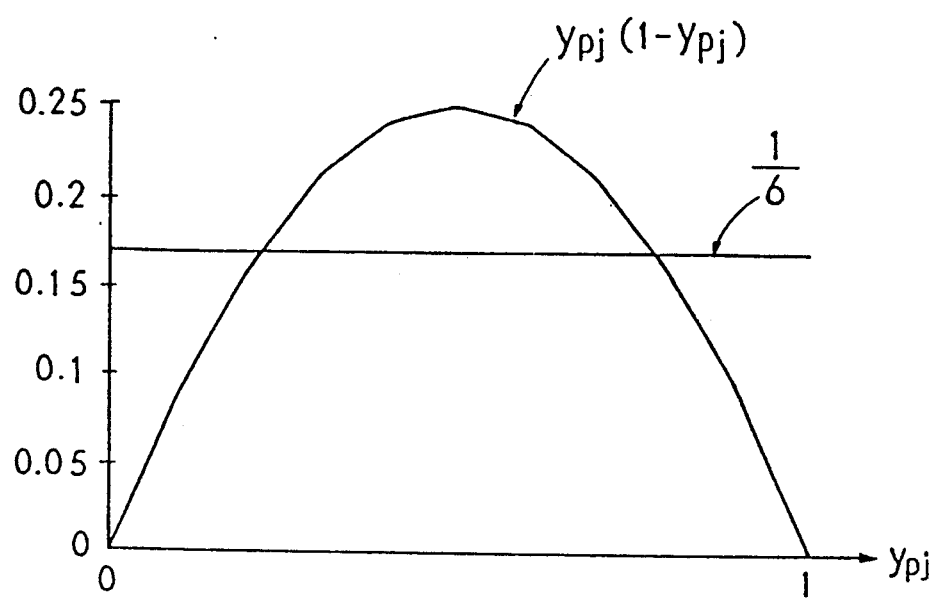
FIG. 8 shows a view for explaining an error propagation coefficient determined as being a constant value, FIGS. 9A and 9B designate a flowchart for executing the first or second embodiment of the present invention.

Further, in order to solve an inconvenience that the value of the error propagation coefficient fluctuates according to the magnitude of the analog level value of the desired value, a configuration is made such that the value of the error propagation coefficient $[y_{pj}(1-y_{pj})]$ is made constant in the first and second embodiments of the present invention. To maintain consistency with the learning according to the conventional back propagation method, the constant is set at approximately the same value as when the basic unit 1 j in the output layer uses the threshold function. E.g. as shown in FIG. 8, this constant value is set at the average value of the error propagation coefficient $[y_{pj}(1-y_{pj})]$, $$\int_0^1 y_{pj}(1 - y_{pj}) dy_{pj} = \frac{1}{6}$$

When the constant is set at this value, the first updating factor $\alpha_{pj}$ defined by equation (10) is expressed as $$\alpha_{pj} = \frac{1}{6} \cdot (d_{pj} - y_{pj}) = \frac{1}{6} \cdot E_{pj}$$

where
$$E_{pj} = (d_{pj} - y_{pj})$$

When a data processing of an output value of an analog value can thus be handled, various new problems arise. One such problem is that the learning of the weight value takes too much time regarding the data processing handling a case in which the fewer desired values of the desired pattern take an analog level between "1" and "0" and a majority of the desired values of the desired patterns take the lower limit "0", as in the process of determining a possible value as a specific value and classifying the possible value. That is, as explained in the description of the prior art, in such a case, because the updating quantity for the weight value is controlled by the data related to the desired value "0", the data related to desired values other than "0" are diluted or disappear, and the learning of the desired value other than "0" does not converge so easily.

To counter this, when a majority of desired values of the desired pattern take either the upper limit value or the lower limit value, the updating coefficient computing unit 23 in the first and second embodiments amplifies the first updating factor $\alpha_{pj}$ by amplifying the error value computed from a minority of the desired values of the desired pattern and the output value of the corresponding output pattern, e.g. fivefold, in order to speed up the error propagation and thus the updating of the weight value. Since the updating quantity of the inner state value for a minority of the desired values of the upper limit or lower limit are made large by this amplifying processing, the learning of the inner state value can be executed at high speed without being affected by a majority of desired values of the lower limit value or the upper limit value.

In the first and second embodiments, if a majority of the desired values of the desired pattern take the lower limit value, the updating coefficient calculating unit 23 disregards the first updating coefficient $\alpha_{pj}$ by disregarding the error value as for the output value of the output pattern outside the lower limit. Furthermore, if many desired values of the desired pattern take the upper limit value, as for the output value outside of the upper limit value, the first updating coefficient $\alpha_{pj}$ disregarded by disregarding the error value. Even if some values are outside the upper or lower limit values, since in an actual processing the limiter 13 limits them, there is no practical problem. Because this processing utilizes this fact, it saves an unnecessary learning and the learning of the inner state value is executed at a higher speed.

Figure 9A:
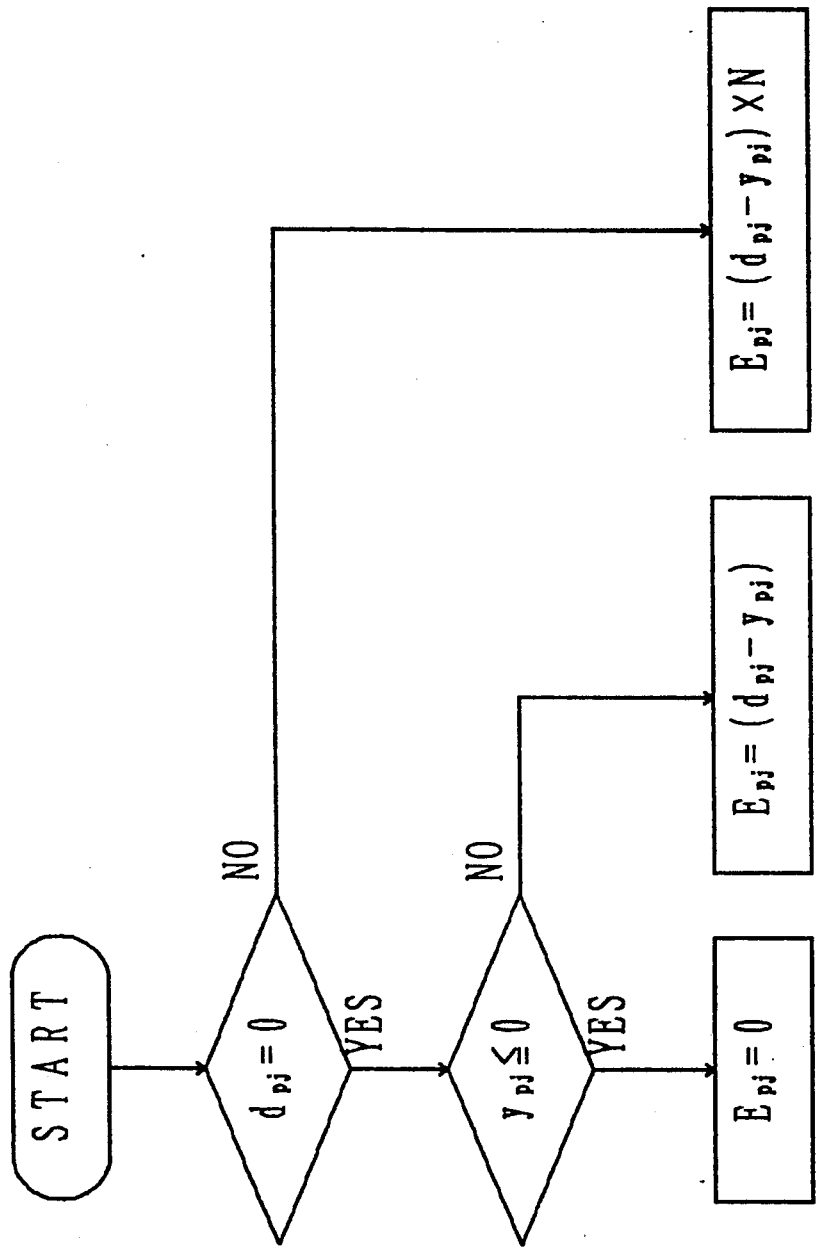

As shown in the flowchart of FIG. 9A, this invention performs a process to make the first updating coefficient $\alpha_{pj}$ larger than the actual value by multiplying $E_{pj}$, which defines the size of the first updating coefficient $\alpha_{pj}$, by N when the value of the desired value $d_{pj}$ is not "0". According to this process, the updating quantity for the fewer desired values other than "0" becomes large. Consequently, the delay in learning the weight value for the desired value is prevented. Then, when the desired value $d_{pj}$ is "0" and the value of the output value $y_{pj}$ is negative, the value of $E_{pj}$ is set to "0" to prevent an unnecessary learning of reverting to "0". Meanwhile, when the value of the desired $d_{pj}$ is "0" and the value of the output value $y_{pj}$ is positive, the processing is performed without multiplying $E_{pj}$ by this coefficient. According to this process, the problem of delay in learning the weight value, which arises when a large number of desired values take the lower limit value "0", can be solved.

Figure 9B:
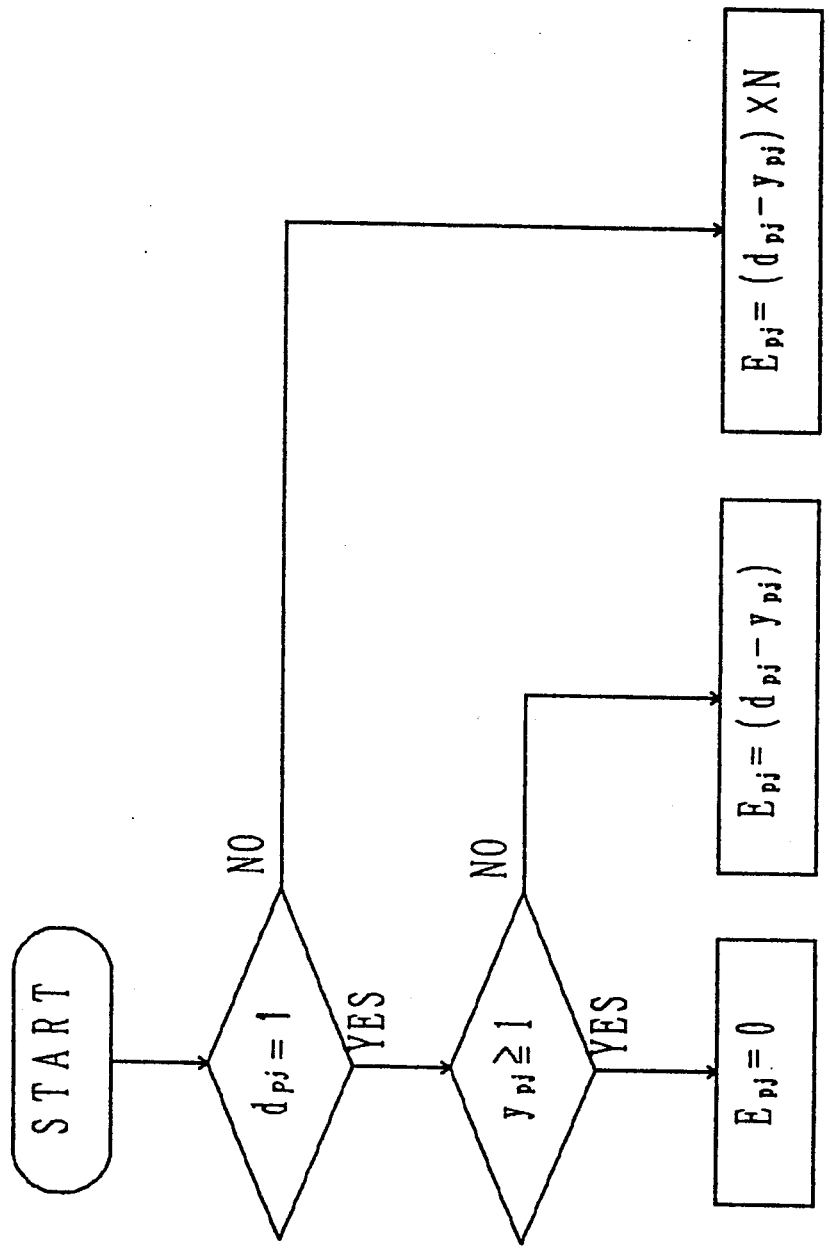

In contrast, when a majority of desired values take the upper limit value "1", processes are executed according to flowchart shown in FIG. 9B. When a configuration is made such that analog levels can be handled by using the linear region of the threshold value function, the process of judging whether or not the desired value $d_{pj}$ in the flowchart shown in FIG. 9A is executed at the lower limit value of the linear region. The process of judging of whether or not the teacher value $d_{pj}$ in the flowchart shown in FIG. 9B is "1" is executed at the upper limit value of the linear region.

Figure 11:
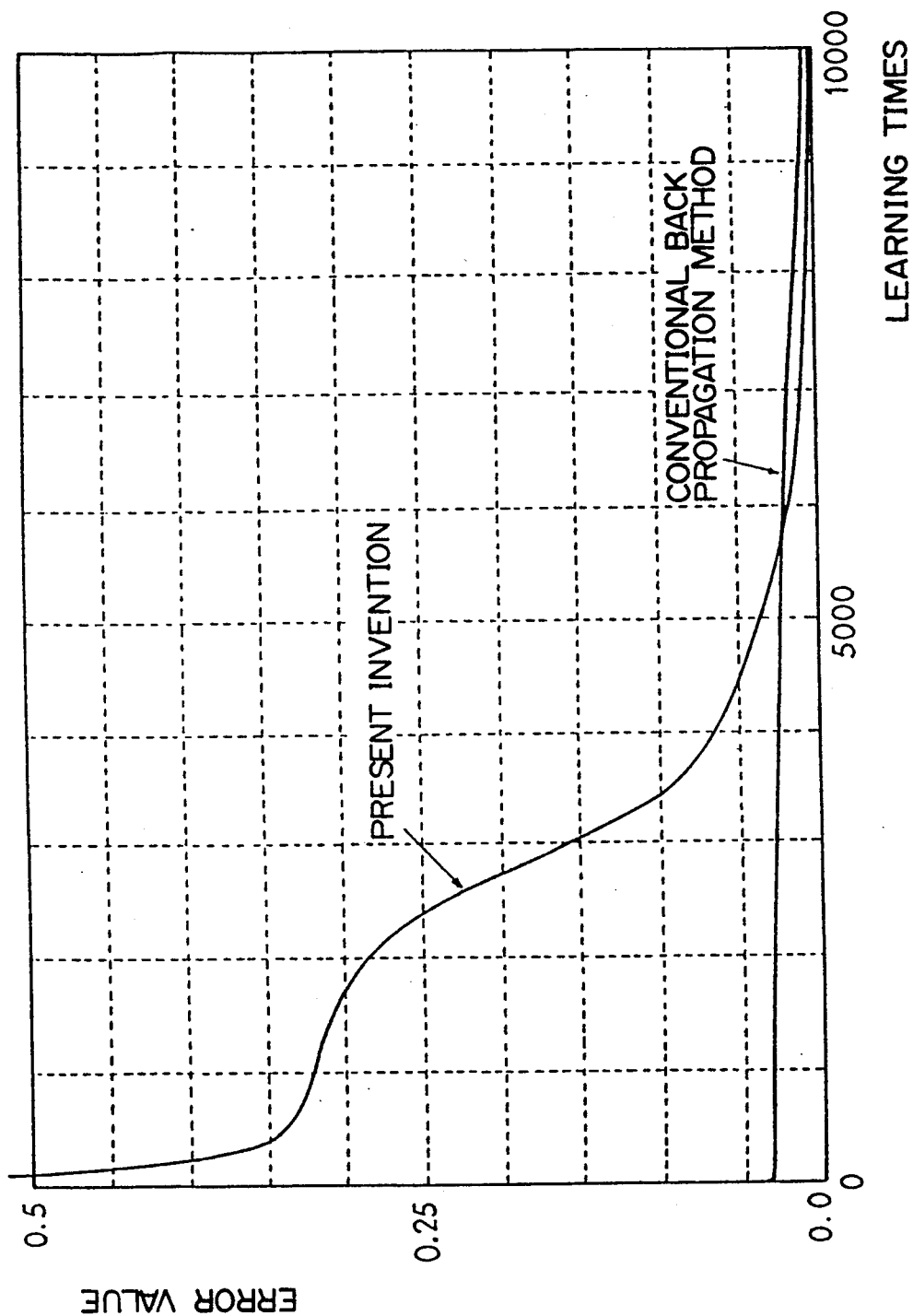
FIG. 11 shows a graph for explaining the simulation data.
Figure 12:
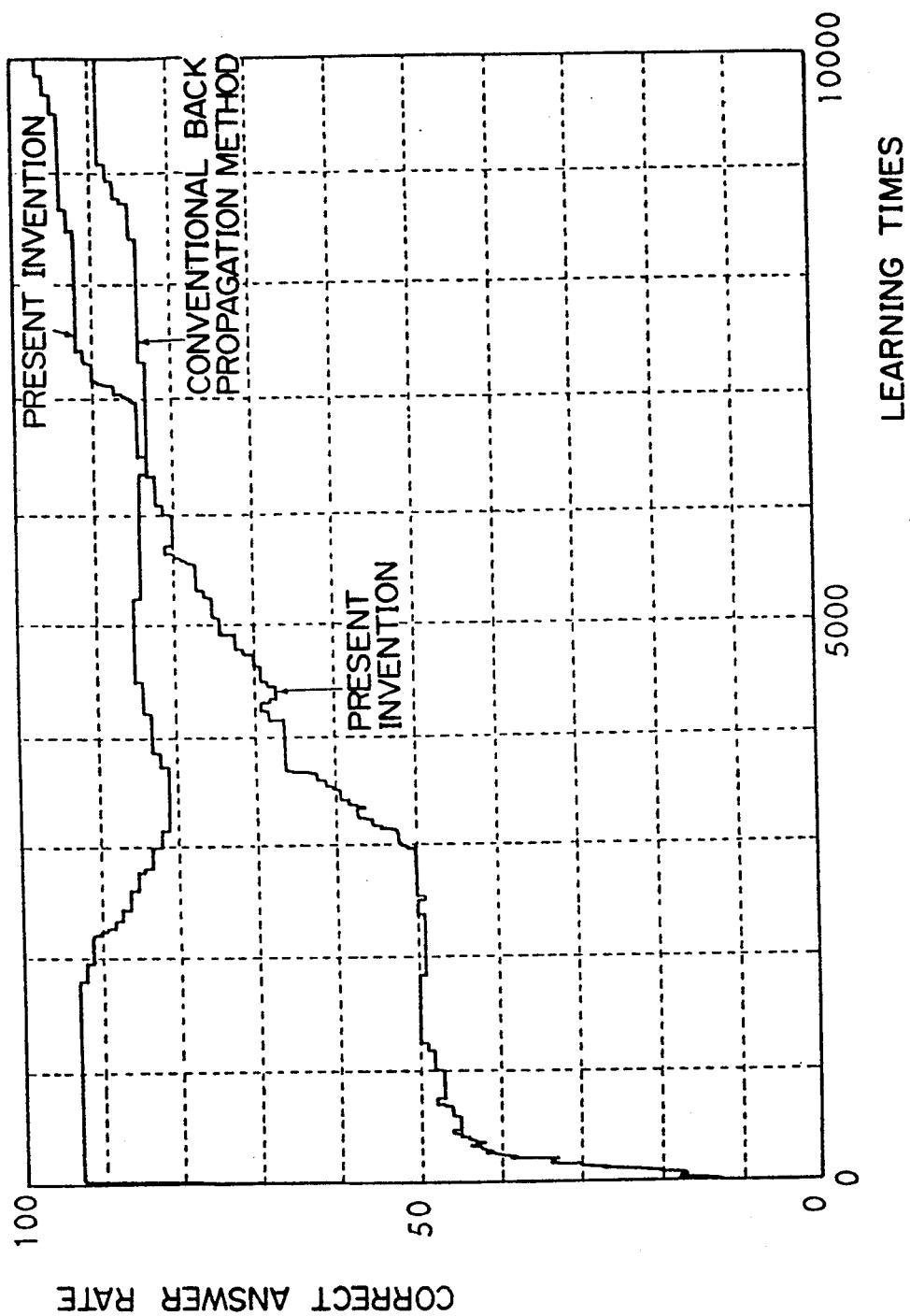
FIG. 12 shows another graph for explaining the simulation data.
Figure 13:
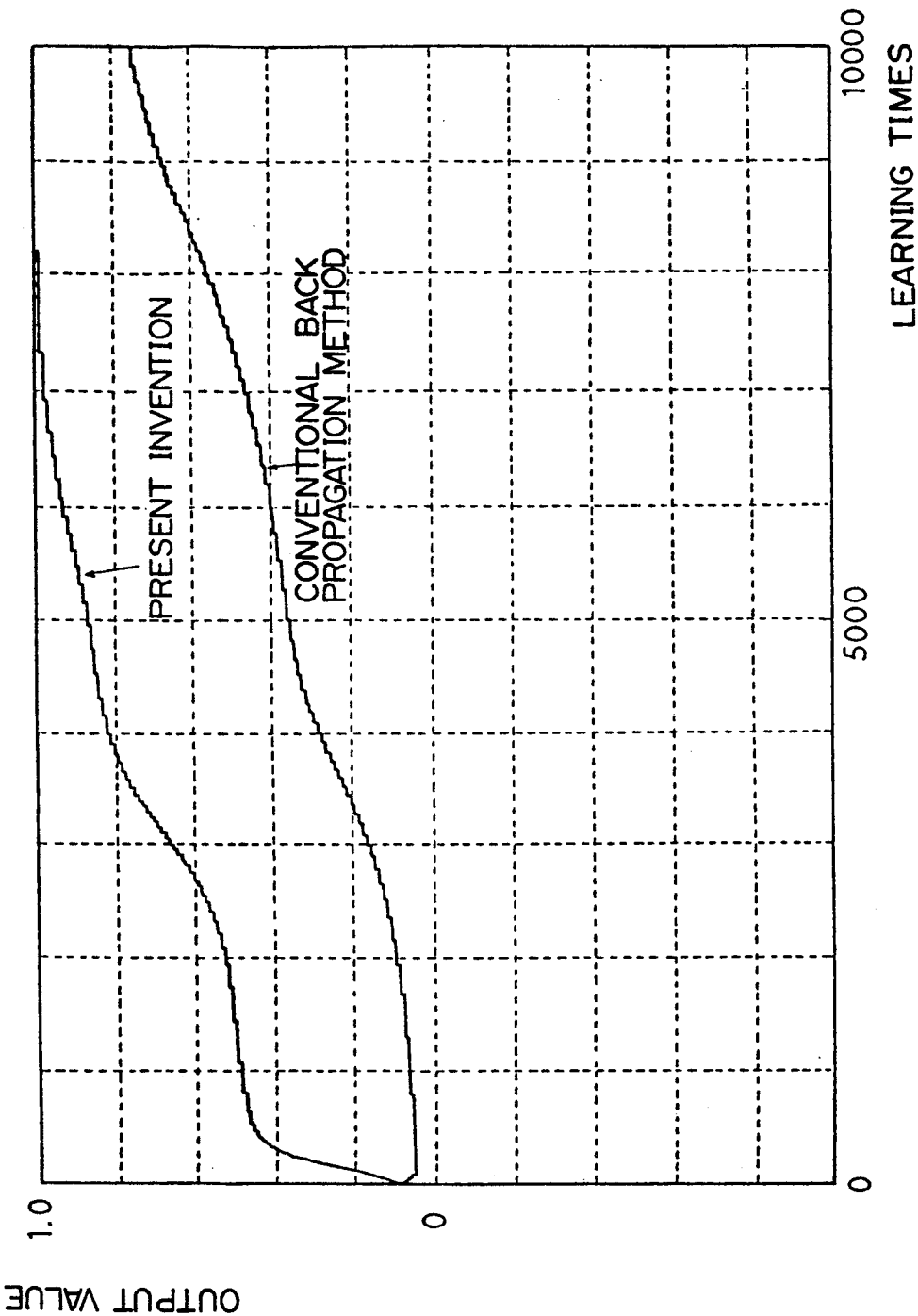
FIG. 13 shows a further graph for explaining the simulation data.

Next, using the simulation results shown in FIGS. 11 through FIG. 13, it is explained how this invention performs data processing of the analog values highly accurately and how the learning of the weight value therefor can be performed at a high speed. This simulation assumes a configuration of a layer network comprising an input layer of 20 units, an intermediate layer of 10 units and an output layer of 1 unit. The unit in the output layer executes the input/output conversion in accordance with the linear function and uses equations (15') and (16') (where $\epsilon = 1$ and $\zeta = 0.4$) and the value of the error propagation coefficient is set to 1/6, the flowchart (where N=5) shown in FIG. 9A is to be followed, and the 100 patterns shown in FIGS. 10A and 10B are used for the desired patterns. Here, the interpretation of FIGS. 10A and 10B is explained. For example, for the twentieth desired pattern having values s=2, t=20 and $d_{pj}=1.00$, "1" is inputted to the second (the value of s, i.e. 2) unit of the twenty units of the input layer and "1" is inputted to the twentieth unit (the value of t, i.e. 20) of the twenty units of the input layer. "0" is inputted to all other units in the input layer. At this time, the output value from the unit in the output layer is "1", i.e. the desired value. As can be understood from the desired pattern shown in FIGS. 10A and 10B, the desired values of the desired patterns used in this simulation are mostly "0.00".

The simulation data shown in FIG. 11 show plottings of how the error value between the desired pattern and the output pattern changes as the learning proceeds for this invention and for the conventional back propagation method. As can be understood from FIG. 11, it is confirmed that this invention realizes a convergence with a smaller error value than the conventional method and that the learning times therefor can be greatly reduced.

The simulation data shown in FIG. 12 show plot of how the correct answer (defined as the value of the output pattern upon inputting the input pattern for learning falling within [the desired value $\pm 0.01$]) rate of the learning pattern changes as the learning proceeds, for this invention and the conventional back propagation method. As can be understood from FIG. 12, it is confirmed that this invention realizes a higher correct answer rate with a smaller learning time than the conventional method.

The simulation data shown in FIG. 13 show plot of how the output pattern value upon an input of the twentieth input pattern for learning changes according to the proceeding of the learning, for this invention and the conventional back propagation method. As can be understood from FIG. 13, it is confirmed that this invention realizes a faster convergence to the desired value "1" than the conventional method.

The preferred embodiments shown in the drawings have been explained, but this invention is no way limited to these embodiments. For example, this invention is applicable "as is" to the invention for realizing a processing of learning the weight value in a short time by improving the back propagation method in the "Japanese Patent Application No. sho63-227825" filed on Sep. 12, 1988, entitled "the learning process method for a network-configuring data-processing device."

As explained, this invention enables an adaptable network-configuring data-processing device to execute the data processing of analog level output values with a high degree of accuracy and the learning of the weight value of the network structure to conducted fast.

What is claimed is:

1. A network structure data processing apparatus connectable to receive a plurality of inputs and an inner state value to be multiplied by the inputs to provide a sum-of-products value, converting the sum-of-products value by using a definition function, comprising:
   an input layer for receiving an input pattern;
   at least one intermediate layer comprising a plurality of basic units, each of said basic units using a threshold function as the definition function;
   an input layer for receiving an input pattern;
   at least one intermediate layer comprising a plurality of basic units, each of said basic units using a threshold function as the definition function;
   an output layer comprising at least one basic unit and providing an output value, said at least one basic unit using a linear function as the definition function;
   means for forming inner connections determining an inner state value between said input layer and said intermediate layer, and between said intermediate layer and said output layer to form a layer network unit; and limiter means for limiting the output value from said output layer to an upper limit value of a desired value of a desired pattern when the output value is greater than the upper limit value and for limiting the output value from said output layer to a lower limit value of the desired value of the desired pattern when the output value is less than the lower limit value.

2. The network structure data processing apparatus according to claim 1, wherein said linear function is defined as $y_{pj} = k\Sigma y_{pi} W_{ji}$ where $y_{pj}$ is an output from the j-th unit of an j layer in response to an input of the p-th pattern; k is a constant, $y_{pi}$ is an output from the i-th unit of an i layer in response to an output of the p-th pattern, and $W_{ji}$ is a weight of an inner connection between i-j layers.

3. A learning processing method for use in a data processing apparatus connectable to receive an input pattern and an inner state value and comprising a layer network including an input layer, an output layer, and an intermediate layer connected between the input layer and the output layer, the method comprising the steps of:

(a) receiving the input pattern in the input layer;

(b) providing from the input layer a plurality of inputs responsive to the input pattern;

(c) receiving the inputs from the input layer in the intermediate layer;

(d) forming inner connections for determining the inner state value between the input layer and the intermediate layer, and between the intermediate layer and the output layer to form the layer network unit;

(e) determining a sum-of-products value by multiplying the inner state value by the inputs and converting the sum-of-products value using a threshold function to provide an intermediate output from the intermediate layer;

(f) determining a sum-of-products value by multiplying the intermediate output by the inner state value and converting the sum-of-products value using a linear function to provide a final output and an output pattern from the output layer;

(g) limiting the final output from the output layer by upper and lower limit values of a desired value of a desired pattern;

(h) determining an error propagation coefficient as a constant value based on the output pattern, the desired pattern and the inner state value;

(i) calculating an updating quantity of the inner state value based on the output pattern in response to an error value between the desired pattern and the output pattern and in response to the input pattern and the desired pattern;

(j) updating the inner state value in accordance with the updating quantity; and (k) setting the error propagation coefficient, for calculating the updating quantity of the inner state value, as a constant value substantially equal to an average value of the error propagation coefficient obtained when the output layer uses the threshold function and when a learning of the inner state value is executed.

4. The learning processing method according to claim 3, wherein said constant value is 1/6.

5. The learning processing method according to claim 3, further comprising the step of:

amplifying the error value for calculating the updating quantity of the inner state value when the desired value of the desired pattern provides a greater number of lower limit values or a greater number of upper limit values than the number of upper limit values or the number of lower limit values respectively, the error value being calculated from the desired value having the less number of upper limit values or the less number of lower limit values and the corresponding output pattern so that the updating quantity of the inner state value is calculated.

6. A network structure data processing apparatus connectable to receive a plurality of inputs and an inner state value to be multiplied by the inputs to provide a sum-of-products value, and converting the sum-of-products value by using a threshold function, comprising:

an input layer for receiving an input pattern;

at least one intermediate layer comprising a plurality of basic units;

an output layer comprising at least one basic unit and providing an output value;

means for forming inner connections for determining the inner state value between said input layer and said intermediate layer, and between said intermediate layer and said output layer;

means for determining, as the inner state value, a value learned in accordance with a desired value which is converted to a corresponding value in a linear range of the threshold function;

limiter means for limiting the output value from said output layer to an upper limit value of the desired value after conversion when the output value is greater than the upper limit value and for limiting the output value from said output layer to a lower limit value of a desired value of the desired pattern when the output value is less than the lower limit value, and providing an output; and value range restoring means for converting the output value of said limiter means to a value range of the desired value before conversion.

* * * * *